United States Patent
Yamamoto

(10) Patent No.: US 9,584,727 B2
(45) Date of Patent: Feb. 28, 2017

(54) PHOTOGRAPHING APPARATUS AND PHOTOGRAPHING CONTROL SYSTEM

(71) Applicant: RICOH IMAGING COMPANY, LTD., Tokyo (JP)

(72) Inventor: Yasuhiro Yamamoto, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/889,979

(22) PCT Filed: May 8, 2014

(86) PCT No.: PCT/JP2014/062323
§ 371 (c)(1),
(2) Date: Nov. 9, 2015

(87) PCT Pub. No.: WO2014/185328
PCT Pub. Date: Nov. 20, 2014

(65) Prior Publication Data
US 2016/0094767 A1    Mar. 31, 2016

(30) Foreign Application Priority Data
May 17, 2013 (JP) ................................ 2013-104778

(51) Int. Cl.
H04N 5/228    (2006.01)
H04N 5/225    (2006.01)
(Continued)

(52) U.S. Cl.
CPC ............. *H04N 5/2328* (2013.01); *G03B 5/00* (2013.01); *H04N 5/2353* (2013.01);
(Continued)

(58) Field of Classification Search
USPC ........ 348/207.99, 208.1–208.6, 208.99, 376; 396/52–55; 382/263, 264, 312
See application file for complete search history.

(56) References Cited

U.S. PATENT DOCUMENTS 7,480,457 B2    1/2009 Uenaka et al.
2008/0037980 A1*    2/2008 Okumura ............... G03B 17/02
    396/535
(Continued)

FOREIGN PATENT DOCUMENTS

JP    2001-157106    6/2001
JP    2006-101452    4/2006
(Continued)

OTHER PUBLICATIONS

U.S. Appl. No. 14/765,666 to Terauchi et al., filed Aug. 4, 2015.
(Continued)

*Primary Examiner* — Aung S Moe
*Assistant Examiner* — Euel Cowan
(74) *Attorney, Agent, or Firm* — Greenblum & Bernstein, P.L.C.

(57) ABSTRACT

In a photographing apparatus and a photographing control system, an image sensor drive controller drives an image sensor in a direction which is different from the direction of an optical axis of a photographing optical system via an electromagnetic drive system in accordance with a first drive signal, which is generated by a first drive signal generator, and a second drive signal, which is generated by a second drive signal, during a period of exposure of the image sensor, and drives the image sensor in the direction which is different from the direction of the optical axis of the photographing optical system via the electromagnetic drive system in accordance with the first drive signal, which is
(Continued)

generated by the first drive signal generator, during the period of signal readout of the image sensor.

6 Claims, 6 Drawing Sheets

(51) Int. Cl.
*H04N 5/232* (2006.01)
*G03B 5/00* (2006.01)
*H04N 5/235* (2006.01)
*H04N 9/07* (2006.01)

(52) U.S. Cl.
CPC ..... *H04N 5/23258* (2013.01); *H04N 5/23287* (2013.01); *H04N 9/07* (2013.01); *G03B 2205/0038* (2013.01); *G03B 2205/0069* (2013.01)

(56) References Cited

U.S. PATENT DOCUMENTS

2011/0007133 A1* 1/2011 Imanishi ................ G03B 17/00
348/42

2012/0019680 A1 1/2012 Shimada et al.
2012/0063756 A1* 3/2012 Kang ...................... G03B 5/02
396/55
2012/0086824 A1* 4/2012 Asakura ............. H04N 5/23287
348/208.99

FOREIGN PATENT DOCUMENTS

| JP | 2008-035241 | 2/2008 |
|----|-------------|--------|
| JP | 2012-028841 | 2/2012 |
| JP | 2012-168383 | 9/2012 |

OTHER PUBLICATIONS

U.S. Appl. No. 14/769,633 to Yamamoto, filed Aug. 21, 2015.
U.S. Appl. No. 14/773,844 to Yamamoto, filed Sep. 9, 2015.
U.S. Appl. No. 14/765,666 to Terauchi et al., which was filed on Aug. 4, 2015.
U.S. Appl. No. 14/769,633 to Yamamoto, which was filed on Aug. 21, 2015.
U.S. Appl. No. 14/773,844 to Yamamoto, which was filed on Sep. 9, 2015.

* cited by examiner

Fig. 4
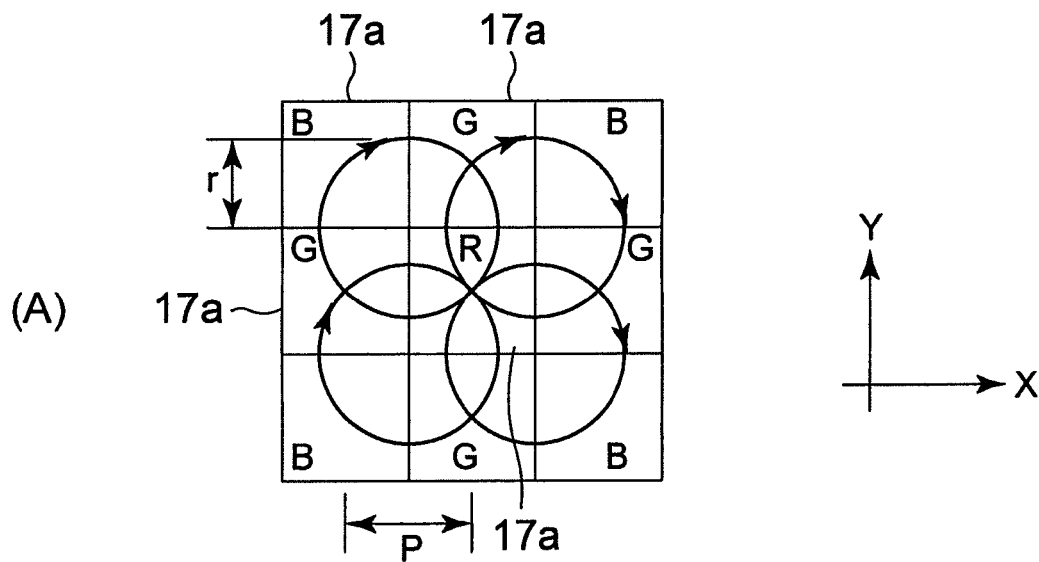
(A)
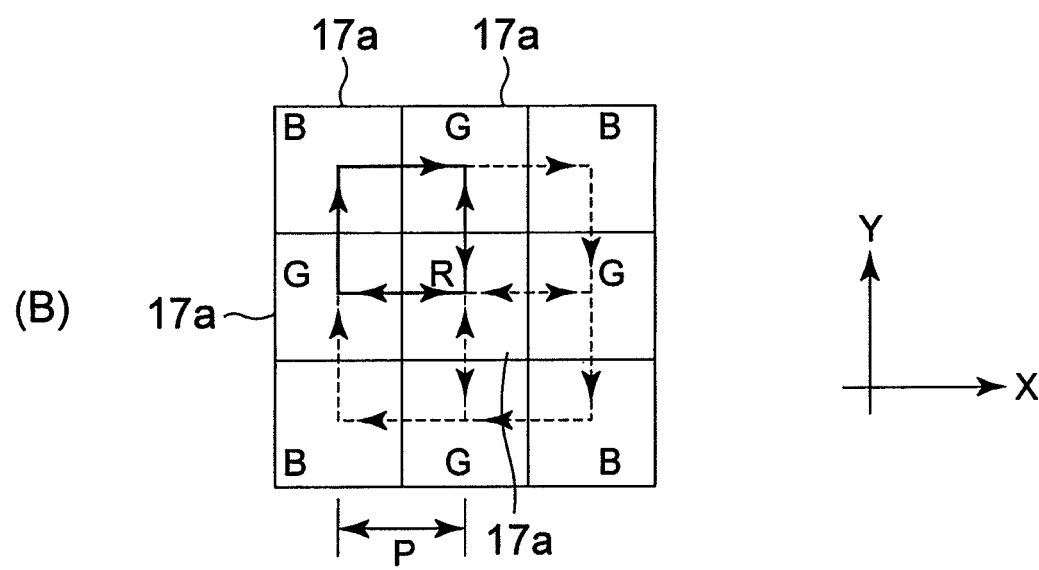
(B)

PHOTOGRAPHING APPARATUS AND PHOTOGRAPHING CONTROL SYSTEM

TECHNICAL FIELD

The present invention relates to a photographing apparatus and a photographing control system which corrects image shake by varying the image formation position of an object image and obtains an optical low-pass filter effect by driving an image sensor in directions different from the direction of an optical axis of a photographing optical system (e.g., in a plane orthogonal to the optical axis) via a single (shared) electromagnetic drive system.

BACKGROUND ART

In this type of photographing apparatus and photographing control system, a single (shared) electromagnetic drive system is known in the art in which a movable stage to which an image sensor is mounted is supported onto a fixed stage in a slidable manner, in which a magnet and a coil are supported to one and the other of the fixed stage and the movable stage, respectively, and in which the movable stage (the image sensor) is driven relative to the fixed stage in directions different from the direction of an optical axis of a photographing optical system (e.g., in a plane orthogonal to the optical axis) by passing an alternating drive signal through the coil.

It is ideal for the alternating drive signal that is passed through the coil to be in synchronization with the horizontal synchronizing signal (horizontal synchronizing signal of an image sensor) which is for an image sensor to read out one line of pixel signal in the horizontal direction. However, since a very small high frequency component for obtaining an optical low-pass filter effect enters the alternating drive signal that is passed through the coil, it is extremely difficult to make the alternating drive signal that is passed through the coil synchronized with the horizontal synchronizing signal of an image sensor. Therefore, during the period of signal readout of the image sensor, so-called magnetic fog phenomenon occurs, in which near-field magnetic field varies in accordance with variations of the alternating drive signal that is passed through the coil, an induced current flows through the loop between a power supply and a GND (ground) in the image sensor in accordance with variations of the aforementioned magnetic field, and the power supply level of the image sensor varies in accordance with variations of the alternating drive signal that is passed through the coil. If magnetic fog phenomenon occurs, patterned noise occurs in the image data that is read out of the image sensor, thus deteriorating image quality.

CITATION LIST

Patent Literature

Patent Literature 1: Japanese Unexamined Patent Publication No. 2008-35241

SUMMARY OF THE INVENTION

Technical Problem

The present invention has been completed based on the above described problems, and an object of the present invention is to prevent magnetic fog phenomenon from occurring during the period of signal readout of an image sensor to thereby obtain high-quality image data in a photographing apparatus, which corrects image shake by varying the image formation position of an object image and obtains an optical low-pass filter effect by driving the image sensor in directions different from the direction of an optical axis of a photographing optical system via a single (shared) electromagnetic drive system.

Solution to Problem

The inventor of the present invention has focused attention on the fact that it is easy to synchronize the drive signal for image-shake correction with the horizontal synchronizing signal of an image sensor, the fact that it is extremely difficult to synchronize the drive signal for the optical low-pass filter effect with the horizontal synchronizing signal of an image sensor, and the fact that magnetic fog phenomenon exerts an adverse effect on the image data quality, particularly during the period of signal readout of an image sensor, and presents no particular problem during a period of exposure time of the image sensor.

Accordingly, the inventor of the present invention has arrived at the present invention as a result of reaching the conclusion that it is possible to obtain high-quality image data by preventing image fog phenomenon from occurring during the period of signal readout of the image sensor if control for image-shake correction is kept ON throughout the period of exposure time of the image sensor and the period of signal readout of the image sensor, and if control for the optical low-pass filter effect is turned ON only during the period of exposure of the image sensor and OFF during the period of signal readout of the image sensor after separately and independently providing a drive signal generator which generates a drive signal (which is easy to be synchronized with the horizontal synchronizing signal of the image sensor) for image shake correction and a drive signal generator which generates a drive signal (which is extremely difficult to be synchronized with the horizontal synchronizing signal of the image sensor).

Specifically, a photographing apparatus according to the present invention is characterized by including an image sensor which includes a plurality of pixels which are mutually different in detection color, converts an object image which is formed through a photographing optical system during a period of exposure into a pixel signal, and reads out the pixel signal during a period of signal readout; an electromagnetic drive system which drives the image sensor in a direction which is different from a direction of an optical axis of the photographing optical system; a first drive signal generator (drive signal generator for image shake correction) which generates a first drive signal (drive signal for image shake correction) that serves as a predetermined timing cue based on a horizontal synchronizing signal with which the image sensor reads out one line of pixel signal in a horizontal direction; a second drive signal generator (drive signal generator for optical low-pass filter effect) which generates a second drive signal (drive signal for optical low-pass filter effect) which has a different period from that of the first drive signal; and an image sensor drive controller which drives the image sensor in the direction which is different from the direction of the optical axis of the photographing optical system via the electromagnetic drive system in accordance with the first drive signal, which is generated by the first drive signal generator, and the second drive signal, which is generated by the second drive signal generator, during the period of exposure of the image sensor. The image sensor drive controller drives the image sensor in the direction which is different from the direction of the optical axis of the photographing optical system via the electromagnetic drive system in accordance with the first drive signal, which is generated by the first drive signal generator, during the period of signal readout of the image sensor.

The first drive signal generator can generate a drive signal to serve as the first drive signal which is in synchronization with the horizontal synchronizing signal, which is used by the image sensor to read out the one line of pixel signal in the horizontal direction, and the second drive signal generator can generate a drive signal to serve as the second drive signal which is not in synchronization with the horizontal synchronizing signal, which is used by the image sensor to readout the one line of pixel signal in the horizontal direction.

The image sensor drive controller can drive the image sensor in the direction which is different from the direction of the optical axis of the photographing optical system via the electromagnetic drive system during the period of exposure of the image sensor in accordance with an asynchronous drive signal which is generated by superposing and synthesizing the first drive signal with the second drive signal generated by the first drive signal generator and the second drive signal generator, respectively, and can drive the image sensor in the direction which is different from the direction of the optical axis of the photographing optical system via the electromagnetic drive system during the period of signal readout of the image sensor in accordance with a synchronous drive signal which is composed of the first drive signal that is generated by the first drive signal generator.

The image sensor drive controller can corrects image shake by varying an image formation position of the object image by driving the image sensor in the direction which is different from the direction of the optical axis of the photographing optical system via the electromagnetic drive system in accordance with the asynchronous drive signal or the synchronous drive signal through the period of exposure and the period of signal readout of the image sensor, and can obtains an optical low-pass filter effect by making object-emanating light rays incident on the plurality of pixels of the image sensor that are mutually different in detection color by driving the image sensor in the direction which is different from the direction of the optical axis of the photographing optical system via the electromagnetic drive system in accordance with the asynchronous drive signal only during the period of exposure of the image sensor.

The electromagnetic drive system can include a fixed support board; a movable stage which is slidable relative to the fixed support board and to which the image sensor is fixed; a magnet and a yoke which are fixed to one of the fixed support board and the movable stage; and a drive coil which is fixed to the other of the fixed support board and the movable stage. The movable stage, to which the image sensor is fixed, can be driven relative to the fixed support board in the direction which is different from the direction of the optical axis of the photographing optical system by applying the asynchronous drive signal or the synchronous drive signal to the drive coil.

A photographing control system according to the present invention is characterized by including an image sensor which includes a plurality of pixels which are mutually different in detection color, converts an object image which is formed through a photographing optical system during a period of exposure into a pixel signal, and reads out the pixel signal during a period of signal readout; an electromagnetic drive system which drives the image sensor in a direction which is different from a direction of an optical axis of the photographing optical system; a first drive signal generator which generates a first drive signal that serves as a predetermined timing cue based on a horizontal synchronizing signal with which the image sensor reads out one line of pixel signal in a horizontal direction; a second drive signal generator which generates a second drive signal which has a different period from that of the first drive signal; and an image sensor drive controller which drives the image sensor in the direction which is different from the direction of the optical axis of the photographing optical system via the electromagnetic drive system in accordance with the first drive signal, which is generated by the first drive signal generator, and the second drive signal, which is generated by the second drive signal generator, during the period of exposure of the image sensor. The image sensor drive controller drives the image sensor in the direction different from the direction of the optical axis of the photographing optical system via the electromagnetic drive system in accordance with the first drive signal, which is generated by the first drive signal generator, during the period of signal readout of the image sensor.

The image sensor is configured of a plurality of components which include a package, amounted image-sensor chip that is housed in this package and a lid member that is fixed to the package so as to seal and protect the solid-state image sensor chip. In the present specification, the expression "driving the image sensor in directions different from the direction of an optical axis of a photographing optical system" refers to driving at least a part of a plurality of elements of the image sensor through which object-emanating light rays pass in directions different from the direction of an optical axis of a photographing optical system.

Advantageous Effects of the Invention

According to the present invention, in a photographing apparatus which corrects image shake by varying the image formation position of an object image and obtains an optical low-pass filter effect by driving an image sensor in directions different from the direction of an optical axis of a photographing optical system via a single (shared) electromagnetic drive system, it is possible to prevent image fog phenomenon from occurring during the period of signal readout of the image sensor to thereby obtain a high-quality image data.

BRIEF DESCRIPTION OF DRAWINGS

FIGS. 4(A) and 4(B) show diagrams illustrating operations for providing an optical low-pass filter effect by driving an image sensor so that it traces a predetermined path, wherein FIG. 4(A) illustrates the case where the image sensor is driven to trace a rotationally symmetrical circular path about an optical axis of a photographing optical system, and FIG. 4(B) illustrates the case where the image sensor is driven to trace a rotationally symmetrical square path about the axis of the photographing optical system;

EMBODIMENT

An embodiment of a digital camera (photographing apparatus/photographing control system) 10 according to the present invention will be hereinafter discussed with reference to FIGS. 1 through 6.

Figure 1:
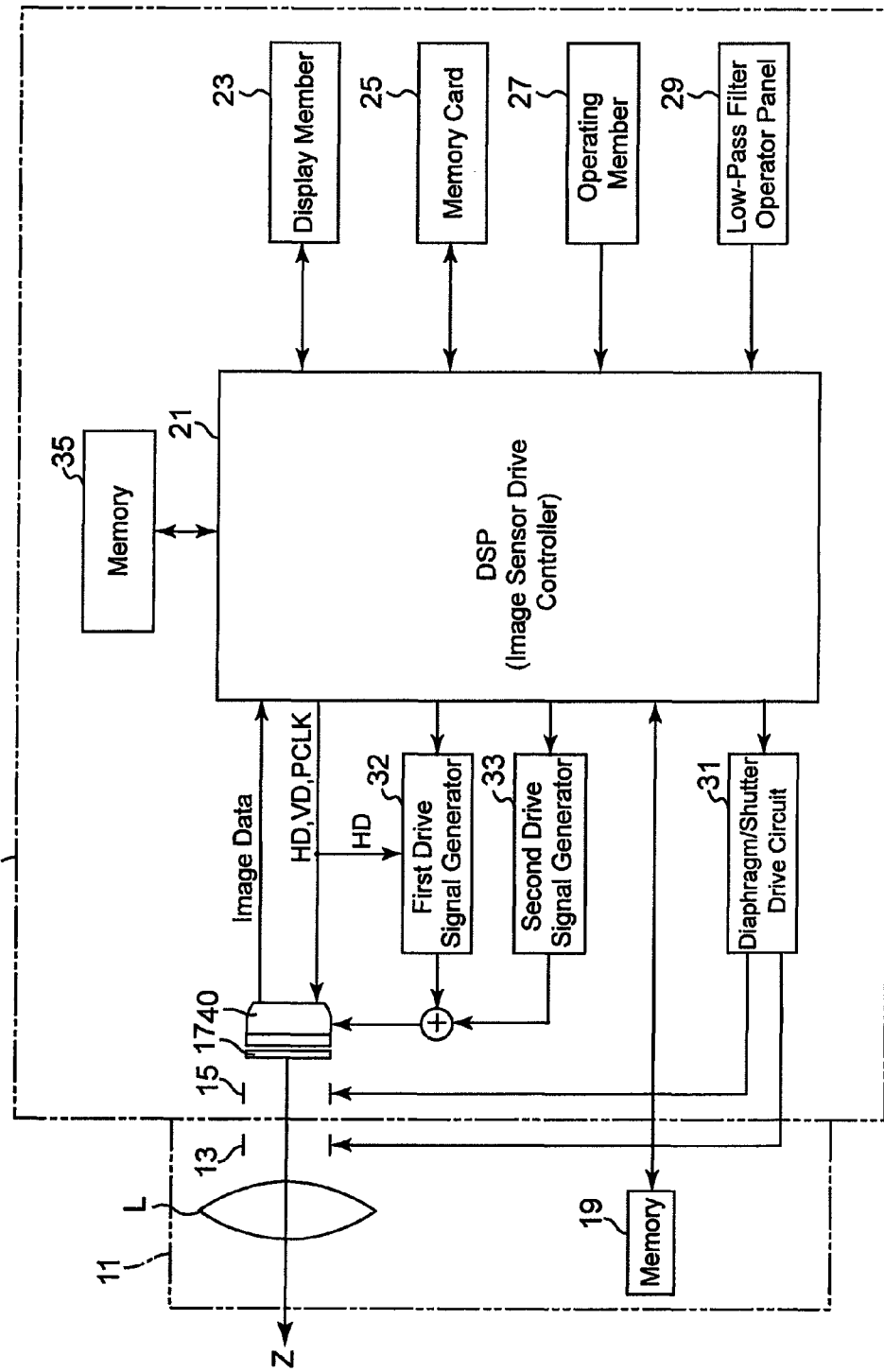
FIG. 1 is a block diagram showing main components of a digital camera (photographing apparatus) according to the present invention.

As shown in FIG. 1, the digital camera 10 is provided with a photographic lens 11 which is detachably attached to the camera body 20 of the digital camera 10. The photographic lens 11 is provided with a photographing lens group L, serving as a photographing optical system, and a diaphragm 13, in that order from the object side (the left side with respect to the drawings), and the camera body 20 is provided with a shutter 15 and an image sensor (image pickup device) 17. An object image formed by object-emanating light rays, which enter from the photographing lens group L and pass through the diaphragm 13 and the fully-opened shutter 15, is formed and exposed on the light receiving surface of the image sensor 17. The object image thus formed on the image sensor 17 is converted into an electrical pixel signal using a large number of pixels arranged in a matrix, and this signal is output as image data (an image signal) to a DSP (image sensor drive controller) 21. More specifically, the image sensor 17 contains a plurality of pixels which are mutually different in detection color and in which an exposure and a signal readout are sequentially performed, converts an object image which is formed through a photographing optical system into an electrical pixel signal during a period of exposure, and reads out the pixel signal to output this pixel signal to the DSP 21 during the period of signal readout. In addition, the DSP 21 performs predetermined image processing on the image data to display this processed image on a display member (LCD monitor) 23, and writes this image data onto a memory card 25. The DSP 21 is connected to operating members 27, a low-pass filter operator panel 29, a diaphragm/shutter drive circuit 31 and a memory 35. The operating members 27 include a power switch and a release switch, etc.; the low-pass filter operator panel 29 includes a switch to turn ON and OFF a low-pass filter operation which will be discussed later, an adjusting switch to adjust the low-pass filter effect, and a direction selection switch to select the oscillating direction of the image sensor during the low-pass filter operation; a diaphragm/shutter drive circuit 31 is for driving and controlling the operations of the diaphragm 13 and the shutter 15, and data on the low-pass filter, etc., has been written into the memory 35. The photographic lens 11 incorporates a memory 19 which has stored therein information on the aperture diameter (aperture value) of the diaphragm 13 and information on the resolving power (MTF) of the photographing lens group L, and the DSP 21 reads these pieces of information. The photographing lens group L includes a plurality of lens groups with the diaphragm 13 generally positioned therebetween in the optical axis direction.

Although not shown in the drawings, the image sensor 17 consists of a plurality of components which include a package, a mounted image-sensor chip that is housed in this package and a lid member that is fixed to the package so as to seal and protect the solid-state image sensor chip. In the present specification, the expression "driving the image sensor 17 in a plane orthogonal to an optical axis of the photographing optical system" refers to driving at least some of a plurality of elements of the image sensor 17 through which object-emanating light rays pass in a plane orthogonal to an optical axis of the photographing optical system.

Figure 3:
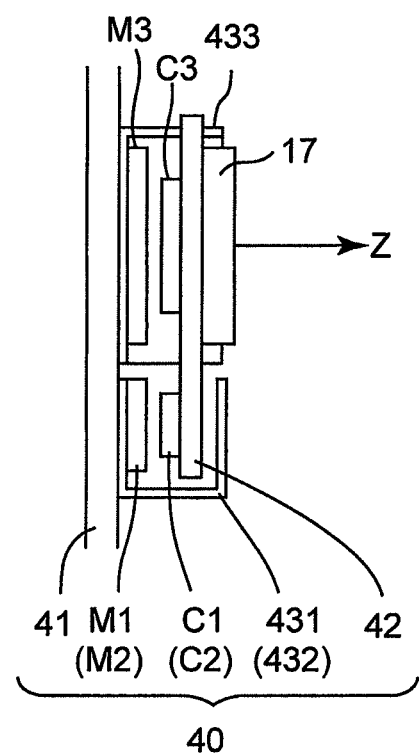
FIG. 3 is a side elevational view of the image shake correcting apparatus (electromagnetic drive system) of the digital camera (photographing apparatus), illustrating the structure thereof.

As shown in FIGS. 1 and 3, the image sensor 17 is mounted onto an image shake correcting apparatus (electromagnetic drive system) 40 in a manner to be movable in an X-axis direction and a Y-axis direction (two orthogonal directions) which are orthogonal to an optical axis Z of the photographic lens 11. The image shake correcting apparatus 40 is provided with a fixed support board 41, a movable stage 42, magnets M1, M2 and M3, yokes 431, 432 and 433, and drive coils C1, C2 and C3. The fixed support board 41 is fixed to a structural member such as a chassis of the camera body 20, the movable stage 42 is slidable relative to the fixed support board 41, and the magnets M1, M2 and M3 are fixed to surfaces of the fixed support board 41 which face the movable stage 42. The yokes 431, 432 and 433 are made of a magnetic material and are fixed to the fixed support board 41 to face the magnets M1, M2 and M3 with the movable stage 42 positioned between the fixed support board 41 and the yokes 431, 432 and 433 to form a magnetic circuit between each yoke 431, 432 and 433 and the associated magnet M1, M2 or M3, and the drive coils C1, C2 and C3 are fixed to the movable stage 42 and each generate a driving force by receiving an electric current within the magnetic field of the aforementioned magnetic circuit. Applying an AC drive signal (AC voltage) to the drive coils C1, C2 and C3 causes the movable stage 42 (the image sensor 17) to move relative to the fixed support board 41 in a plane orthogonal to the optical axis. The AC drive signal (AC voltage) applied to the drive coils C1, C2 and C3 will be discussed in detail later.

In this embodiment, a magnetic driver configured of the magnet M1, the yoke 431 and the drive coil C1, and a magnetic driver configured of the magnet M2, the yoke 432 and the drive coil C2 (i.e., two magnetic drivers) are arranged along the lengthwise direction of the image sensor 17 (horizontal direction/the X-axis direction) with a predetermined distance therebetween; and a magnetic driver (one magnetic driver) configured of the magnet M3, the yoke 433 and the drive coil C3 is arranged along the short side direction of the image sensor 17 that is orthogonal to the lengthwise direction of the image sensor 17 (perpendicular (orthogonal) direction/the Y-axis direction).

Hall sensors H1, H2 and H3 which detect the magnetic forces of the magnets M1, M2 and M3 to detect the position of the movable stage 42 are arranged on the fixed support board 41 in the vicinity of (in the central hollow spaces of) the drive coils C1 through C3, respectively. The position in the Y-axis direction and the inclination (rotation) of the movable stage 42 are detected by the Hall sensors H1 and H2, and the position of the movable stage 42 in the X-axis direction is detected by the Hall sensor H3. The DSP 21 passes an AC drive signal (AC voltage), which will be discussed later, through each drive coil C1 through C3 while detecting the position of the movable stage 42 from the outputs of the Hall sensors H1, H2 and H3 to move the movable stage 42 (the image sensor 17) along a predetermined path and track at a predetermined speed (period). During image shake correcting operation, the DSP 21 performs a shake reduction drive control by detecting an image shake of the digital camera 10 using acceleration sensors not shown in the drawings and by varying the image formation position of an object image by driving the movable stage 42 (the image sensor 17) in a plane orthogonal to the optical axis so that the object image does not move relative to the image sensor 17. In the present embodiment, this operation is referred to as "the image shake correcting operation (image shake correction drive) of the image sensor 17 by the DSP 21 via the image shake correcting apparatus 40."

The image shake correcting apparatus 40 reproduces the effects of an optical low-pass (may also be referred to as an LPF effect in the following descriptions) by making object-emanating light rays incident on a plurality of pixels of the image sensor 17 which are mutually different in detection color by driving the image sensor 17 in a manner such that the image sensor 17 traces a predetermined path in a plane orthogonal to the optical axis Z of a photographing optical system. In the present embodiment, this operation is referred to as the "LPF operation (LPF drive) of the image sensor 17 by the DSP 21 via the image shake correcting apparatus 40."

The image shake correcting apparatus 40 performs "a center-position holding operation (center-position holding drive) for the image sensor 17" for holding the image sensor 17 at the center position in the operating range of the image shake correcting operation of the image sensor 17. For instance, when both "the image shake correcting operation (image shake correction drive) of the image sensor 17" and "the LPF operation (LPF drive) of the image sensor 17" are OFF, a photographing operation is performed with only "the center-position holding operation (center-position holding drive) for the image sensor 17" turned ON (the center holding operation is performed even when the image shake correction operation is not performed).

"The image shake correcting operation (image shake correction drive) of the image sensor 17", "LPF operation (LPF drive) of the image sensor 17" and "the center-position holding operation (center-position holding drive) for the image sensor 17" can be achieved as a combination of these operations (a combination of these driving operations) using the image shake correcting apparatus 40, or only one of these operations can be achieved using the image shake correcting apparatus 40.

With reference to FIGS. 4(A) and 4(B), the low-pass filter operation of the image shake correcting apparatus (electromagnetic drive system) 40 that provides an LPF effect using the image sensor 17 by driving the image sensor 17 so that it traces a predetermined path will be discussed hereinafter. In FIGS. 4(A) and 4(B), the image sensor 17 is provided with a large number of pixels 17a which are arranged in a matrix at a predetermined pixel pitch P on the light receiving surface, and one of color filters R, G and B arranged in Bayer pattern is positioned on the front surface of each pixel 17a. Each pixel 17a detects a color of object-emanating light rays which are incident on the pixel 17a after passing through the color filter R, G or B on the front surface thereof; specifically, each pixel 17a converts light of the color component (color band) into an electrical signal and accumulates electric charge according to the intensity (brightness) of the light.

FIG. 4(A) shows the case where the image sensor 17 is driven to trace a rotationally symmetrical circular path having the center thereof on the optical axis Z of the photographing optical system. This circular path is a circular closed path having a radius r of $2^{1/2}/2$ times the pixel pitch P of the image sensor 17. FIG. 4(B) shows the case where the image sensor 17 is driven to trace a rotationally symmetrical square path having the center thereof on the optical axis Z of the photographing optical system. This square path is a square closed path each side of which has a length equal to the pixel pitch P of the image sensor 17. In FIG. 4(B), the image sensor 17 is driven alternately in the Y-axis direction of the pixels 17a, which is parallel to one of mutually orthogonal alignment directions (perpendicular direction) of the pixels 17a, and in the X-axis direction of the pixels 17a, which is parallel to the other direction (horizontal direction), per unit of the pixel pitch P so that the image sensor 17 moves in the square closed path.

If the image sensor 17 is driven to trace the predetermined circular or square path during an exposure as shown in FIGS. 4(A) and 4(B), the object-emanating light rays (ray bundle) incident on the center of each color filter R, G and B (each pixel 17a) are equally incident on four color filters R, G, B and G, so that the effect equivalent to that obtained using an optical low-pass filter is obtained. Namely, the light rays incident on any of the color filters R, G, B and G (the pixels 17a) are reliably incident on the peripheral color filters R, G, B and G (the peripheral pixels 17a), so that the effect (an LPF effect) equivalent to that obtained in the case where the light rays are passed through an optical low-pass filter is obtained.

Additionally, by stepwisely changing the drive range of the image sensor 17 (by varying the radius r in the case where the path is circular in shape or by varying the length of one side of the path in the case where the path is square in shape), the intensity of the LPF effect can be adjusted stepwise. Accordingly, the LPF effect is enhanced as the radius r of the circular path or the length of one side of the square path is increased (as the range of the pixels 17a (the color filters R, G, B and G) of the image sensor 17, on which object-emanating light rays are incident, which are mutually different in detection color is enlarged). On the other hand, the LPF effect is weakened as the radius r or the length of the one side is decreased (as the range of the pixels 17a (the color filters R, G, B and G) of the image sensor 17, on which object-emanating light rays are incident, which are mutually different in detection color is reduced).

Figure 2:
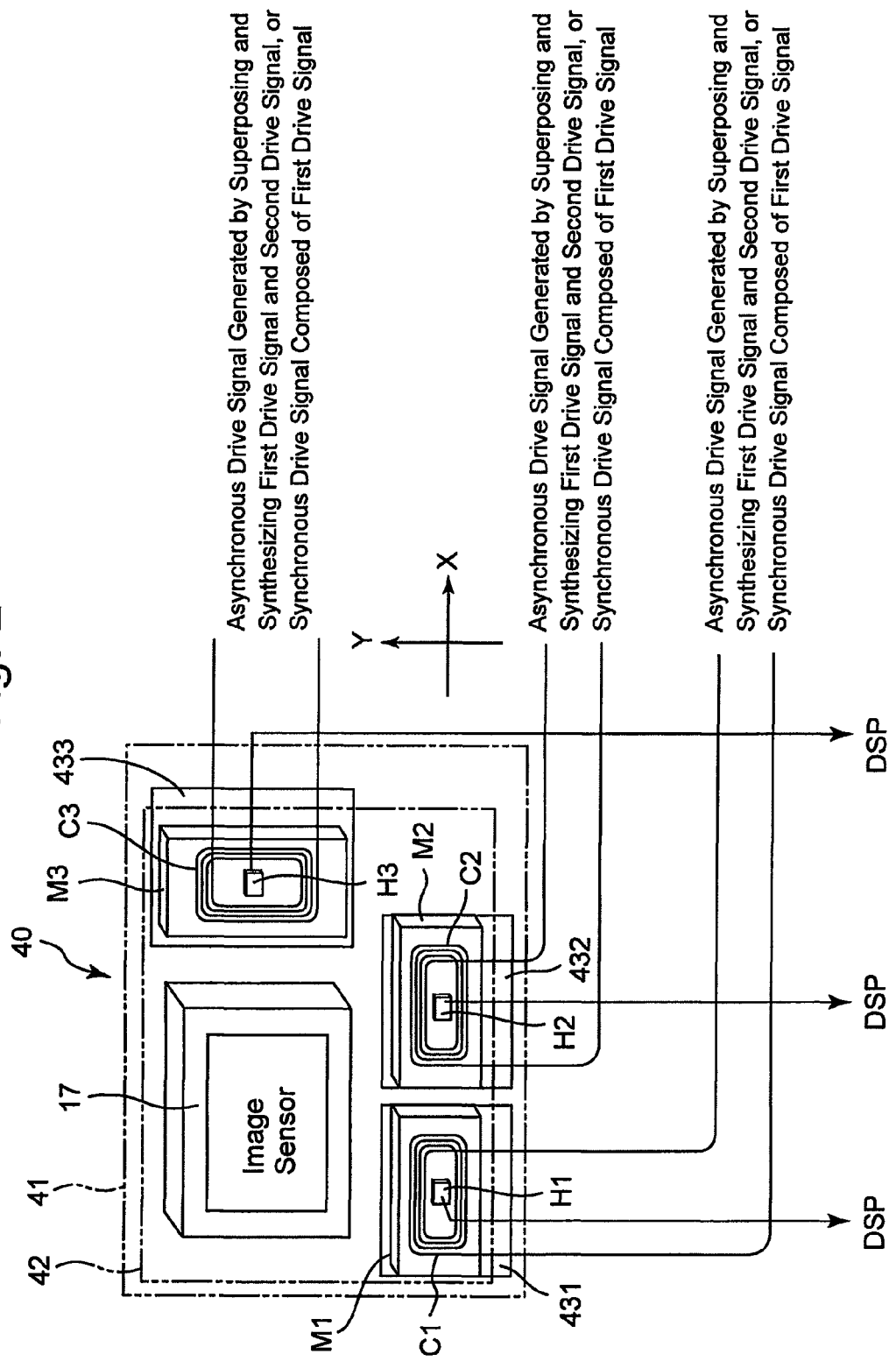
FIG. 2 is a block diagram showing main components of an image shake correcting apparatus (electromagnetic drive system) of the digital camera (photographing apparatus) according to the present invention.

As shown in FIGS. 1 and 2, the digital camera 10 is provided with a first drive signal generator (drive signal generator for image shake correction) 32 and a second drive signal generator (drive signal generator for LPF effect) 33 which are for generating an AC drive signal (AC voltage) which is applied to the drive coils C1, C2 and C3 of the image shake correcting apparatus (electromagnetic drive system) 40.

The first drive signal generator 32 generates a first drive signal (drive signal for image-shake correction) which serves as a predetermined timing cue based on the horizontal synchronizing signal (HD) with which the image sensor 17 reads out one line of pixel signal in the horizontal direction. More specifically, the first drive signal generator 32 generates a first drive signal (drive signal for image-shake correction) which is in synchronization with the horizontal synchronizing signal (HD) with which the image sensor 17 reads out one line of pixel signal in the horizontal direction. Since the period of the first drive signal is close to the period (e.g., several tens of microseconds) of the horizontal synchronizing signal (HD) of the image sensor 17, it is easy to synchronize the first drive signal with the horizontal synchronizing signal (HD) of the image sensor 17.

The second drive signal generator 33 generates a second drive signal (drive signal for LPF effect) different in period from that of the first drive signal (drive signal for image shake correction) generated by the first drive signal generator 32. More specifically, the second drive signal generator 33 generates a second drive signal (drive signal for LPF effect) which is not in synchronization with the horizontal synchronizing signal (HD) with which the image sensor 17 reads out one line of pixel signal in the horizontal direction. Since the period of the second drive signal is much smaller than the period (e.g., several tens of microseconds) of the horizontal synchronizing signal (HD) of the image sensor 17 (since the period of the second drive signal is composed of a very small high frequency component), it is extremely difficult to synchronize the second drive signal with the horizontal synchronizing signal (HD) of the image sensor 17.

During a period of exposure of the image sensor 17, the DSP (image sensor drive controller) 21 performs both an image shake correcting operation and the LPF operation by driving the image sensor 17 in a plane orthogonal to the optical axis via the image shake correcting apparatus (electromagnetic drive system) 40 in accordance with the first drive signal generated by the first drive signal generator 32 and the second drive signal that the second drive signal generator 33. More specifically, during a period of exposure of the image sensor 17, the DSP (image sensor drive controller) 21 performs both an image shake correcting operation and the LPF operation by driving the image sensor 17 in a plane orthogonal to the optical axis via the image shake correcting apparatus (electromagnetic drive system) 40 in accordance with an asynchronous drive signal which is generated by superposing and synthesizing the first drive signal and the second drive signal that the first drive signal generator 32 and the second drive signal generator 33 generate, respectively.

During the period of signal readout from the image sensor 17, the DSP (image sensor drive controller) 21 performs only an image shake correcting operation by driving the image sensor 17 in a plane orthogonal to the optical axis via an image shake correcting apparatus (electromagnetic drive system) 40 in accordance with the first drive signal generated by the first drive signal generator 32, and does not perform the LPF operation. More specifically, during the period of signal readout of the image sensor 17, the DSP (image sensor drive controller) 21 performs only an image shake correcting operation by driving the image sensor 17 in a plane orthogonal to the optical axis via the image shake correcting apparatus (electromagnetic drive system) 40 in accordance with a synchronous drive signal composed of the first drive signal generated by the first drive signal generator 32, and does not perform the LPF operation.

Namely, the DSP (image sensor drive controller) 21 performs an image shake correcting operation through a period of exposure and the period of signal readout of the image sensor in accordance with an asynchronous drive signal or a synchronous drive signal, and performs the LPF operation only during a period of exposure of the image sensor 17 in accordance with an asynchronous drive signal.

By performing both the image shake correcting operation and the LPF operation during a period of exposure of the image sensor 17 in accordance with an asynchronous drive signal which is generated by superposing and synthesizing the first drive signal with the second drive signal generated by the first drive signal generator 32 and the second drive signal generator 33 generate, respectively, it is possible to prevent spurious resolution such as moire and false color from occurring while correcting image displacement caused by hand shake to obtain high-quality image data. In addition, during a period of exposure of the image sensor 17, deterioration in image quality caused by magnetic fog does not occur even if the image sensor 17 is driven in a plane orthogonal to the optical axis in accordance with an asynchronous drive signal.

It is possible to prevent magnetic fog phenomenon from occurring to obtain high-quality image data during the period of signal readout from the image sensor 17 by performing only the image shake correcting operation in accordance with a synchronous drive signal composed of the first drive signal generated by the first drive signal generator 32, and by not performing the LPF operation.

Figure 5:
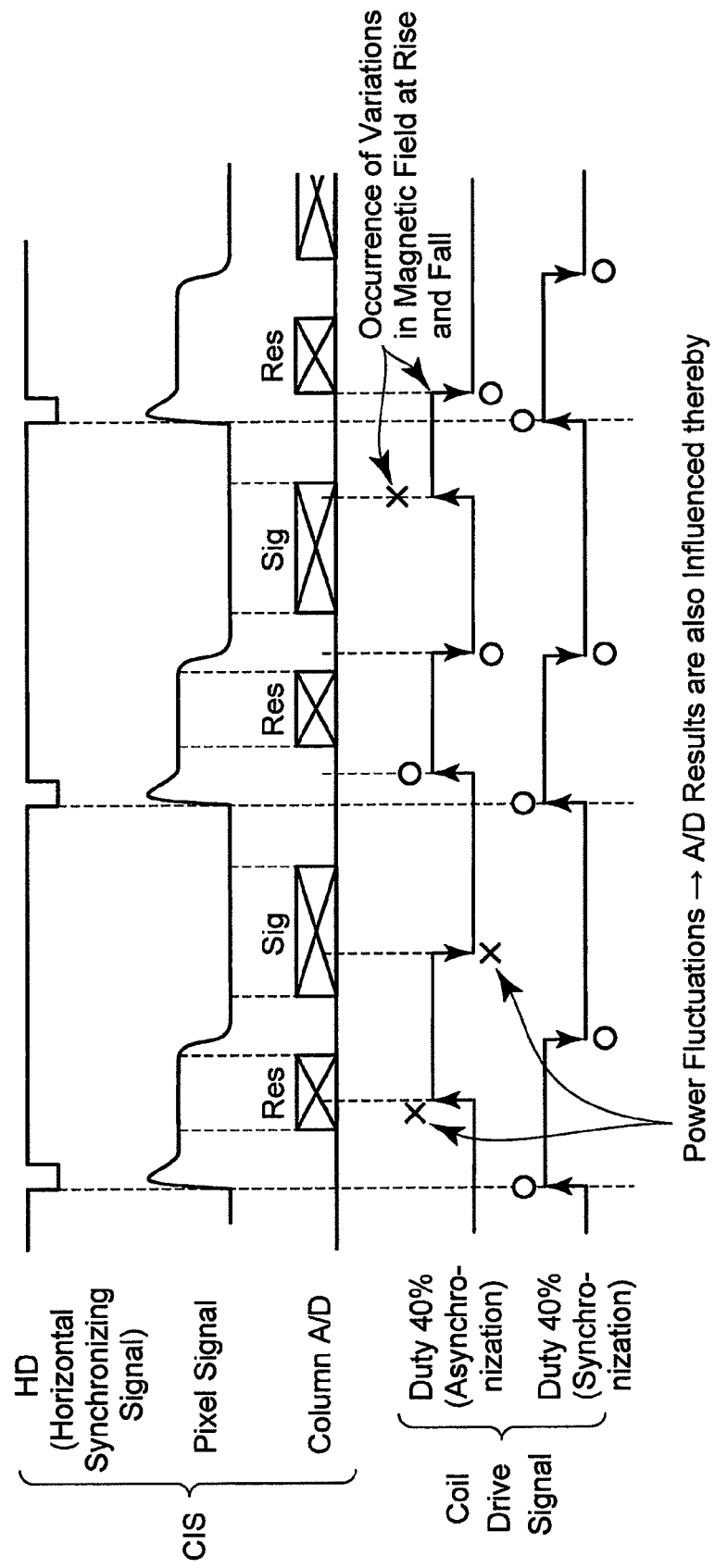
FIG. 5 is a diagram illustrating magnetic fog phenomenon which occurs during the period of signal readout of the image sensor.

The magnetic fog phenomenon which occurs during the period of signal readout of the image sensor 17 will be hereinafter discussed with reference to FIG. 5. In the upper part (CIS) in FIG. 5, the output of a horizontal synchronizing signal (HD), the output of a pixel signal, and A/D conversion periods (Res, Sig) (column A/D) are included in each section in which the image sensor 17 reads out one line of pixel signal in the horizontal direction. In the lower part (coil drive signal) in FIG. 5, "Duty 40 percent (asynchronization)" denotes the asynchronous drive signal consisting of the second drive signal the drive duty ratio of which is 40 percent, and "duty 40 percent (synchronization)" denotes the synchronous drive signal consisting of the first drive signal the drive duty ratio of which is 40 percent. When the synchronous signal (duty 40 percent (synchronization)) is applied to the drive coils C1, C2 and C3, either the rise or the fall of the synchronous signal does not overlap the A/D conversion periods (Res, Sig), so that magnetic fog phenomenon does not occur. Whereas, when the asynchronous signal (duty 40 percent (asynchronization)) is applied to the drive coils C1, C2 and C3, the rise and the fall of the asynchronous signal overlap the A/D conversion periods (Res, Sig), which causes magnetic fog phenomenon to occur.

Figure 6:
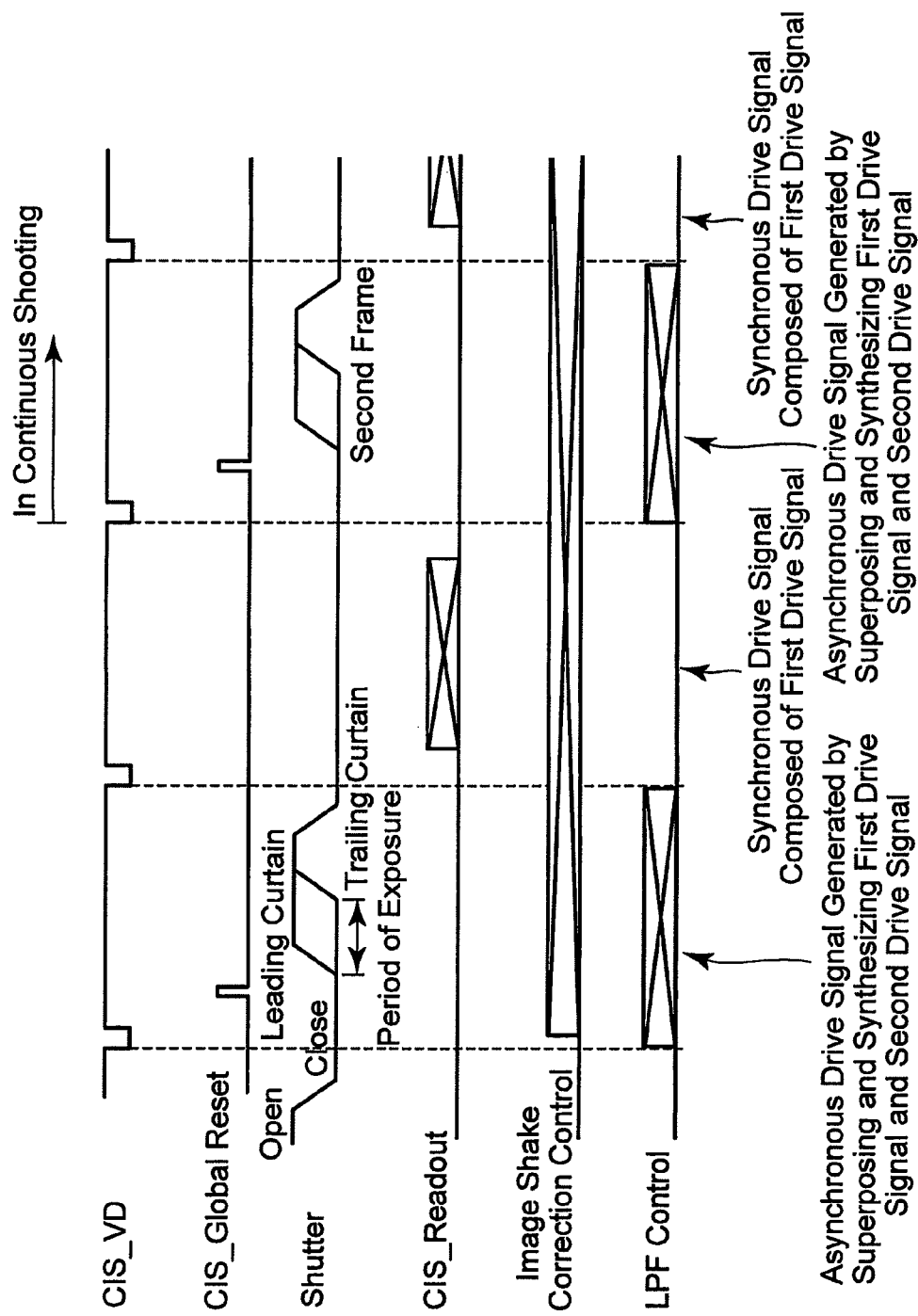
FIG. 6 is a diagram illustrating image shake correction control and LPF control during a period of exposure and the period of signal readout of the image sensor.

The image shake correction control and the LPF control during a period of exposure and the period of signal readout of the image sensor 17 will be hereinafter discussed with reference to FIG. 6. To obtain a single frame of photographed image through the image sensor 17, an exposure and a signal readout are sequentially performed. The output of a vertical synchronizing signal (CIS-VD) is contained in each period of exposure and each signal readout period, and the output of a CIS-global reset signal is contained in each period of exposure. An exposure is performed by opening and shutting the shutter 15 in each period of exposure, and a signal readout is performed by the image sensor 17 in each period of signal readout. Additionally, an image shake correcting operation is performed in accordance with an asynchronous drive signal or a synchronous drive signal through a period of exposure and the period of signal readout of the image sensor 17, and the LPF operation is performed in accordance with an asynchronous drive signal only during a period of exposure of the image sensor 17. Additionally, during a continuous photographic shooting, an exposure and a signal readout that are performed by the image sensor 17 are also sequentially performed.

As described above, according to the present embodiment of the digital camera (imaging apparatus) 10, during an exposure of the image sensor 17, the DSP (image sensor drive controller) 21 drives the image sensor 17 in a plane orthogonal to the optical axis via the image shake correcting apparatus (electromagnetic drive system) 40 in accordance with an asynchronous drive signal which is generated by superposing and synthesizing the first drive signal with the second drive signal generated by the first drive signal generator 32 and the second drive signal generator 33, respectively, and during the period of signal readout of the image sensor 17, the DSP (image sensor drive controller) 21 drives the image sensor 17 in a plane orthogonal to the optical axis via the image shake correcting apparatus (electromagnetic drive system) 40 in accordance with a synchronous drive signal which is generated by the first drive signal generator 32 composed of the first drive signal generated by the first drive signal generator 32, and accordingly, it is possible to prevent magnetic fog phenomenon from occurring during the period of signal readout of the image sensor 17 to thereby obtain high-quality image data.

In the above described embodiment, the first drive signal generator 32 and the second drive signal generator 33 are provided as separate and independent elements; however, as long as the first drive signal and the second drive signal can be separately and independently output, there is a degree of freedom as to whether the separate and independent output of the first drive signal and the second drive signal is to be achieved with hardware or software.

Although the case where the magnets M1, M2 and M3 and the yokes 431, 432 and 433 are fixed to the fixed support board 41 and the drive coils C1, C2 and C3 are fixed to the movable stage 42 has been illustrated as a configuration of the image shake correcting apparatus (electromagnetic drive system) 40 in the above described embodiment, this positional relationship can be reversed, i.e., an embodiment in which the magnets and the yokes are fixed to the movable stage and the drive coils are fixed to the fixed support board is also possible.

Although the case where the predetermined path that the image sensor 17 traces is a rotationally symmetrical circular or square path having the center thereof on the optical axis Z of the photographic optical system has been illustrated in the above described embodiment, the present invention is not limited thereto; for instance, the predetermined path that the image sensor 17 traces can be defined as a linearly-reciprocal moving path which lies in a plane orthogonal to the optical axis Z of the photographic optical system.

Although the case where the image sensor 17 is driven in a plane orthogonal to the optical axis via the image shake correcting apparatus (electromagnetic drive system) 40 to perform the image shake correcting operation and the LPF operation has been illustrated in the above described embodiment, the direction in which the image sensor 17 is driven is not limited thereto and can be any direction different from the direction of the optical axis of the photographing optical system.

INDUSTRIAL APPLICABILITY

It is desirable that the photographing apparatus and the photographing control system according to the present invention be used as a photographing apparatus and a photographing control system of a digital camera, etc.

REFERENCE SIGNS LIST

| | |
|---|---|
| 10 | Digital camera (Photographing apparatus/Photographing control system) |
| 11 | Photographic lens |
| L | Photographing lens group (Photographing optical system) |
| 13 | Diaphragm (Photographing optical system) |
| 15 | Shutter |
| 17 | Image sensor (Image pickup device) |
| 17a | Pixel |
| 19 | Memory |
| 20 | Camera body |
| 21 | DSP (Image sensor drive controller) |

-continued
REFERENCE SIGNS LIST

| | |
|---|---|
| 23 | Display member (LCD monitor) |
| 25 | Memory card |
| 27 | Operating member |
| 29 | Low-pass filter operator panel |
| 31 | Diaphragm/shutter drive circuit |
| 32 | First drive signal generator (Drive signal generator for image shake correction) |
| 33 | Second drive signal generator (Drive signal generator for optical low-pass filter effect) |
| 35 | Memory |
| 40 | Image shake correcting apparatus (Electromagnetic drive system) |
| 41 | Fixed support board |
| 42 | Movable stage |
| 431 432 433 | Yoke |
| C1 C2 C3 | Drive coil |
| H1 H2 H3 | Hall sensor |
| M1 M2 M3 | Magnet |
| R G B | Color filter |

The invention claimed is:

1. A photographing apparatus comprising:
an image sensor which includes a plurality of pixels which are mutually different in detection color, converts an object image which is formed through a photographing optical system during a period of exposure into a pixel signal, and reads out said pixel signal during a period of signal readout;
an electromagnetic drive system which drives said image sensor in a direction which is different from a direction of an optical axis of said photographing optical system;
a first drive signal generator which generates a first drive signal that serves as a predetermined timing cue based on a horizontal synchronizing signal with which said image sensor reads out one line of pixel signal in a horizontal direction;
a second drive signal generator which generates a second drive signal which has a different period from that of said first drive signal; and
an image sensor drive controller which drives said image sensor in said direction which is different from said direction of said optical axis of said photographing optical system via said electromagnetic drive system in accordance with said first drive signal, which is generated by said first drive signal generator, and said second drive signal, which is generated by said second drive signal generator, during said period of exposure of said image sensor, and
wherein said image sensor drive controller drives said image sensor in said direction which is different from said direction of said optical axis of said photographing optical system via said electromagnetic drive system in accordance with said first drive signal, which is generated by said first drive signal generator, during said period of signal readout of said image sensor.

2. The photographing apparatus according to claim 1, wherein said first drive signal generator generates a drive signal to serve as said first drive signal which is in synchronization with said horizontal synchronizing signal, which is used by said image sensor to read out said one line of pixel signal in said horizontal direction, and
wherein said second drive signal generator generates a drive signal to serve as said second drive signal which is not in synchronization with said horizontal synchronizing signal, which is used by said image sensor to read out said one line of pixel signal in said horizontal direction.

3. The photographing apparatus according to claim 1, wherein said image sensor drive controller drives said image sensor in said direction which is different from said direction of said optical axis of said photographing optical system via said electromagnetic drive system during said period of exposure of said image sensor in accordance with an asynchronous drive signal which is generated by superposing and synthesizing said first drive signal with said second drive signal generated by said first drive signal generator and said second drive signal generator, respectively, and drives said image sensor in said direction which is different from said direction of said optical axis of said photographing optical system via said electromagnetic drive system during said period of signal readout of said image sensor in accordance with a synchronous drive signal which is composed of said first drive signal that is generated by said first drive signal generator.

4. The photographing apparatus according to claim 3, wherein said image sensor drive controller corrects image shake by varying an image formation position of said object image by driving said image sensor in said direction which is different from said direction of said optical axis of said photographing optical system via said electromagnetic drive system in accordance with said asynchronous drive signal or said synchronous drive signal through said period of exposure and said period of signal readout of said image sensor, and
   wherein said image sensor drive controller obtains an optical low-pass filter effect by making object-emanating light rays incident on said plurality of pixels of said image sensor that are mutually different in detection color by driving said image sensor in said direction which is different from said direction of said optical axis of said photographing optical system via said electromagnetic drive system in accordance with said asynchronous drive signal only during said period of exposure of said image sensor.

5. The photographing apparatus according to claim 1, wherein said electromagnetic drive system comprises:
   a fixed support board;
   a movable stage which is slidable relative to said fixed support board and to which said image sensor is fixed;
   a magnet and a yoke which are fixed to one of said fixed support board and said movable stage; and
   a drive coil which is fixed to the other of said fixed support board and said movable stage,
   wherein said movable stage, to which said image sensor is fixed, is driven relative to said fixed support board in said direction which is different from said direction of said optical axis of said photographing optical system by applying said asynchronous drive signal or said synchronous drive signal to said drive coil.

6. A photographing control system comprising:
   an image sensor which includes a plurality of pixels which are mutually different in detection color, converts an object image which is formed through a photographing optical system during a period of exposure into a pixel signal, and reads out said pixel signal during a period of signal readout;
   an electromagnetic drive system which drives said image sensor in a direction which is different from a direction of an optical axis of said photographing optical system;
   a first drive signal generator which generates a first drive signal that serves as a predetermined timing cue based on a horizontal synchronizing signal with which said image sensor reads out one line of pixel signal in a horizontal direction;
   a second drive signal generator which generates a second drive signal which has a different period from that of said first drive signal; and
   an image sensor drive controller which drives said image sensor in said direction which is different from said direction of said optical axis of said photographing optical system via said electromagnetic drive system in accordance with said first drive signal, which is generated by said first drive signal generator, and said second drive signal, which is generated by said second drive signal generator, during said period of exposure of said image sensor, and
   wherein said image sensor drive controller drives said image sensor in said direction different from said direction of said optical axis of said photographing optical system via said electromagnetic drive system in accordance with said first drive signal, which is generated by said first drive signal generator, during said period of signal readout of said image sensor.

* * * * *